(12) United States Patent
Takahashi et al.

(10) Patent No.: US 9,616,372 B2
(45) Date of Patent: Apr. 11, 2017

(54) PLUGGED HONEYCOMB STRUCTURE

(71) Applicant: NGK Insulators, Ltd., Nagoya (JP)

(72) Inventors: Akira Takahashi, Nagoya (JP); Yuichi Hamazaki, Nagoya (JP); Tetsuo Toyoshima, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 188 days.

(21) Appl. No.: 14/476,837

(22) Filed: Sep. 4, 2014

(65) Prior Publication Data

US 2014/0370235 A1 Dec. 18, 2014

Related U.S. Application Data (63) Continuation of application No. PCT/JP2013/051292, filed on Jan. 23, 2013.

(30) Foreign Application Priority Data

Mar. 14, 2012 (JP) .................................. 2012-057176

(51) Int. Cl.
*B01D 46/24* (2006.01)
*F01N 3/022* (2006.01)
(Continued)

(52) U.S. Cl.
CPC ...... *B01D 46/2459* (2013.01); *C04B 38/0012* (2013.01); *F01N 3/0222* (2013.01);
(Continued)

(58) Field of Classification Search
None
See application file for complete search history.

(56) References Cited

U.S. PATENT DOCUMENTS

2004/0071932 A1 4/2004 Ishihara et al.
2006/0249888 A1 11/2006 Ishihara et al.
(Continued)

FOREIGN PATENT DOCUMENTS

JP 61-10917 U 1/1986
JP 2004-124723 A1 4/2004
(Continued)

OTHER PUBLICATIONS

Extended European Search Report (Application No. 13760334.6) dated Nov. 13, 2015.
(Continued)

*Primary Examiner* — David Sample
*Assistant Examiner* — Nicholas W Jordan
(74) *Attorney, Agent, or Firm* — Burr & Brown, PLLC (57) ABSTRACT

A honeycomb structure has porous partition walls defining and forming a plurality of cells communicating between two end faces, and a circumferential wall formed integrally with the partition walls. The cells include partial cells positioned in an outermost circumferential portion of the honeycomb structure and being partially in contact with the circumferential wall, and normal cells other than the partial cells. As to the normal cells, a plugging portion is formed in one end portion of each normal cell, and as to the partial cells, in the partial cells in which the plugging portion to be formed in one end portion thereof, the plugging portion is not formed in at least a part of a partial cell in which an area ratio obtained by Equation (1) is smaller than 80%:

the area ratio(%)=an area of the partial cell/an area of the normal cell×100     (1).

12 Claims, 2 Drawing Sheets

(51) Int. Cl.
*C04B 38/00* (2006.01)
*C04B 111/00* (2006.01)

(52) U.S. Cl.
CPC .. *B01D 46/2448* (2013.01); *B01D 2046/2481* (2013.01); *B01D 2046/2485* (2013.01); *B01D 2046/2496* (2013.01); *C04B 2111/00793* (2013.01); *F01N 2330/06* (2013.01); *F01N 2330/48* (2013.01); *Y02T 10/20* (2013.01); *Y10T 428/24157* (2015.01)

(56) References Cited

U.S. PATENT DOCUMENTS

| | | |
|---|---|---|
| 2007/0184241 A1 | 8/2007 | Ichikawa |
| 2008/0157441 A1 | 7/2008 | Ito et al. |
| 2008/0220203 A1 | 9/2008 | Ichikawa et al. |
| 2009/0239031 A1 | 9/2009 | Ichikawa et al. |
| 2011/0224069 A1 | 9/2011 | Goto et al. |

FOREIGN PATENT DOCUMENTS

| | | |
|---|---|---|
| JP | 2004-154768 A1 | 6/2004 |
| JP | 2005-199179 A1 | 7/2005 |
| JP | 2007-203628 A1 | 8/2007 |
| JP | 2011-183360 A1 | 9/2011 |
| WO | 2008/081649 A1 | 7/2008 |
| WO | 2008/123369 A1 | 10/2008 |

OTHER PUBLICATIONS

International Search Report and Written Opinion (Application No. PCT/JP2013/051292) dated May 14, 2013 (with partial English translation).

Japanese Office Action, Japanese Application No. 2014-504728, dated Aug. 30, 2016 (2 pages).

PLUGGED HONEYCOMB STRUCTURE

BACKGROUND OF THE INVENTION

1. Field of the Invention

The present invention relates to a plugged honeycomb structure for use as a filter to trap a particulate matter such as soot discharged from a diesel engine or a gasoline engine.

2. Description of Related Art

Heretofore, a honeycomb structure has been used as a filter to trap a particulate matter (PM) such as soot discharged from a diesel engine or a gasoline engine.

In general, such a honeycomb structure has porous partition walls defining and forming a plurality of cells communicating between two end faces, and a circumferential wall formed integrally with the partition walls, and in such a plugging pattern that the two end faces show complementary checkered patterns, a plugging portion is formed in one end portion of each cell.

As a manufacturing method of such a honeycomb structure, first, there is known a method in which a honeycomb-like structure including partition walls formed integrally with a circumferential wall (the honeycomb structure) is prepared by extrusion, and a plugging material is charged into one end portion of each cell of the honeycomb structure to form each plugging portion.

Additionally, in such a manufacturing method, the cells of the honeycomb structure prepared by the extrusion include partial cells positioned in an outermost circumferential portion of the honeycomb structure and partially in contact with the circumferential wall, and normal cells other than the partial cells. Each partial cell has a part of a contour thereof formed by the circumferential wall. Therefore, the partial cell has a different shape from the normal cell and also has a smaller area than the normal cell. In consequence, it is more difficult to form the plugging portion in the partial cell than in the normal cell, and more labor is required.

Thus, heretofore, various investigations have been performed concerning how to treat the partial cells, and there has been suggested a honeycomb structure having a different configuration in accordance with the way of the treatment. Representative examples of the configuration include configurations (1) to (3) described in the following.

(1) A configuration in which plugging portions are formed in end portions of partial cells in such a plugging pattern as to form a checkered pattern, in the same manner as in normal cells (e.g., see Patent Document 1).

(2) A configuration in which plugging portions are formed in all cells present in a region of several cells including partial cells from a circumference (e.g., see Patent Document 2).

(3) A configuration in which any plugging portions are not formed in partial cells, or cells present in a region of several cells including the partial cells from a circumference (e.g., see Patent Document 3).

However, the configurations of the above (1) and (2) have an excellent PM trapping performance, but have the problem that cracks are easily generated when a PM accumulated in the honeycomb structure is burnt and removed to recover a filter. As one of causes for this problem, it is considered that the plugging portions are formed even in the partial cells having a small area, whereby a rigidity (Young's modulus) of the honeycomb structure is high, and a heat stress during the recovery is large. Furthermore, as another cause, it is considered that the plugging portions formed in the partial cells operate in a heat insulating manner, whereby a temperature gradient in the honeycomb structure during the recovery is large.

On the other hand, the configuration of the above (3) has an excellent crack resistance during the recovery, but the PM allowed to flow into the partial cells in which any plugging portions are not formed is hardly trapped, but passes the honeycomb structure as it is, which has caused a problem in a trapping performance. In recent years, strictness of PM emission regulations has remarkably increased. Especially in European Union (EU), a stricter emission regulation on the basis of the number of the PMs is scheduled to be introduced in addition to a conventional emission regulation on the basis of a mass of the PM. In the configuration of the above (3), it is considered to be difficult to cope with such strengthening of the emission regulations.

It is to be noted that as a manufacturing method which is different from the above manufacturing methods, there is also known a method in which plugging portions are formed in normal cells of a honeycomb structure prepared by extrusion, then circumferential processing is performed to remove a circumferential wall, and then a coating material is applied to the processed portion to form the circumferential wall again (e.g., see Patent Document 4). In this manufacturing method, when the coating material is applied, portions which have been the partial cells are filled with the coating material, so that it is possible to obtain the honeycomb structure in which all the cells are only constituted of the normal cells in which the plugging portions are beforehand formed.

However, when this honeycomb structure is manufactured, a step of performing the circumferential processing to remove the circumferential wall and a step of applying the coating material to form again the circumferential wall are required. Therefore, many steps are required until completion, which causes a problem in the aspect of a manufacturing cost.

CITATION LIST

Patent Documents

[Patent Document 1] JP-A-2007-203628
[Patent Document 2] JP-A-2004-154768
[Patent Document 3] JP-A-2004-124723
[Patent Document 4] JP-A-2005-199179

SUMMARY OF THE INVENTION

Problem to be Solved by the Invention

The present invention has been developed in view of such conventional situations, and an object thereof is to provide a plugged honeycomb structure which is excellent in each of a PM trapping performance, a crack resistance during recovery, and a manufacturing cost.

Means for Solving the Problem

To achieve the above object, according to the present invention, the following plugged honeycomb structure is provided.

According to a first aspect of the present invention, a plugged honeycomb structure is provided; comprising a honeycomb structure having porous partition walls defining and forming a plurality of cells communicating between two end faces, and a circumferential wall formed integrally with the partition walls, wherein the cells include partial cells positioned in an outermost circumferential portion of the honeycomb structure and being partially in contact with the circumferential wall, and normal cells other than the partial cells, and as to the normal cells, a plugging portion is formed in one end portion of each normal cell in such a plugging pattern that the two end faces of the honeycomb structure show complementary checkered patterns, and as to the partial cells, in the partial cells in which the plugging portion is to be formed in one end portion thereof to follow the plugging pattern, the plugging portion is not formed in at least a part of the partial cell in which an area ratio obtained by Equation (1) is smaller than 80%, and the partial cells, which have an area ratio of 80% or more obtained by Equation (1), of 95% or more with respect to the number of all the partial cells each having 80% or more of the area ratio at which the plugging portion is to be formed in the one end portion thereof to follow the plugging pattern are provided with the plugging portions formed therein:

$$\text{the area ratio (\%)} = \text{an area of the partial cell/an area of the normal cell} \times 100 \quad (1)$$

According to a second aspect of the present invention, the plugged honeycomb structure according to the above first aspect is provided, wherein in the partial cells in which the plugging portion is to be formed in the one end portion thereof to follow the plugging pattern, the plugging portions are formed in all the partial cells in which the area ratio obtained by Equation (1) is 80% or more.

According to a third aspect of the present invention, the plugged honeycomb structure according to the above first or second aspects is provided, wherein in the partial cells in which the plugging portion is to be formed in the one end portion thereof to follow the plugging pattern, a ratio of the number of the partial cells in which the area ratio obtained by Equation (1) is smaller than 80% and in which the plugging portions are not formed to the number of all the partial cells in which the plugging portion is to be formed in the one end portion thereof to follow the plugging pattern is 80% or less.

According to a fourth aspect of the present invention, the plugged honeycomb structure according to the above third aspect is provided, wherein in the partial cells the plugging portion is to be formed in the one end portion thereof to follow the plugging pattern, a ratio of the number of the partial cells in which the area ratio obtained by Equation (1) is smaller than 50% and in which the plugging portions are not formed to the number of all the partial cells in which the plugging portion to be formed in the one end portion is thereof to follow the plugging pattern but in which the plugging portion is not formed is 50% or more.

According to a fifth aspect of the present invention, the plugged honeycomb structure according to any one of the above first to fourth aspects is provided, wherein in the partial cells each having the plugging portion formed in the one end portion thereof, a length of the plugging portion in the partial cell in which the area ratio obtained by Equation (1) is 50% or less is 90% or less to a length of the plugging portion in the normal cell, and a length of the plugging portion in the partial cell in which the area ratio obtained by Equation (1) is 20% or less is 60% or less of the length of the plugging portion in the normal cell.

Effect of the Invention

In a plugged honeycomb structure of the present invention, plugging portions are not formed in part of partial cells which have a comparatively small area and into which a PM does not easily flow, but the plugging portions are formed in most of the partial cells which have a comparatively large area and into which the PM easily flows. In this way, the partial cells in which the plugging portions are formed and the partial cells in which the plugging portions are not formed are specified on the basis of the area, so that an excellent effect is produced in each of a PM trapping performance and a crack resistance during recovery. Furthermore, when the plugged honeycomb structure of the present invention is manufactured, a step of removing a circumferential wall once and then forming the circumferential wall again is not required. Therefore, the plugged honeycomb structure can be manufactured in less steps, and is therefore excellent in the aspect of a manufacturing cost.

DETAILED DESCRIPTION OF THE INVENTION

Hereinafter, the present invention will be described on the basis of a specific embodiment, but the present invention is not limited to this embodiment when interpreted, and various changes, modifications and improvements can be added on the basis of knowledge of a person skilled in the art without departing from the gist of the present invention.

Figure 1:
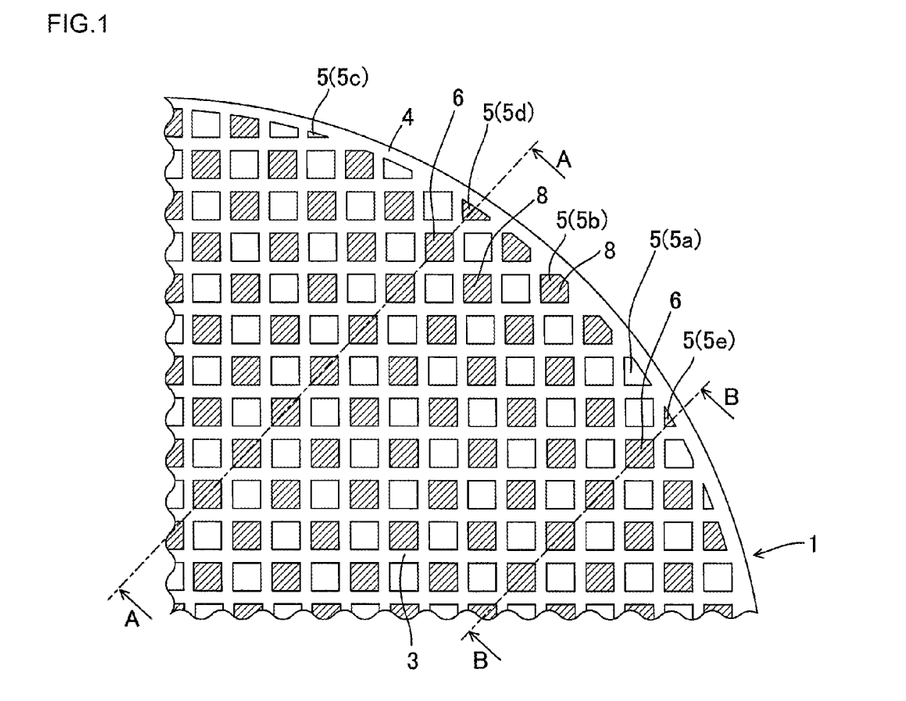
FIG. 1 is a plan view partially showing an end face of a plugged honeycomb structure of the present invention.
Figure 2:
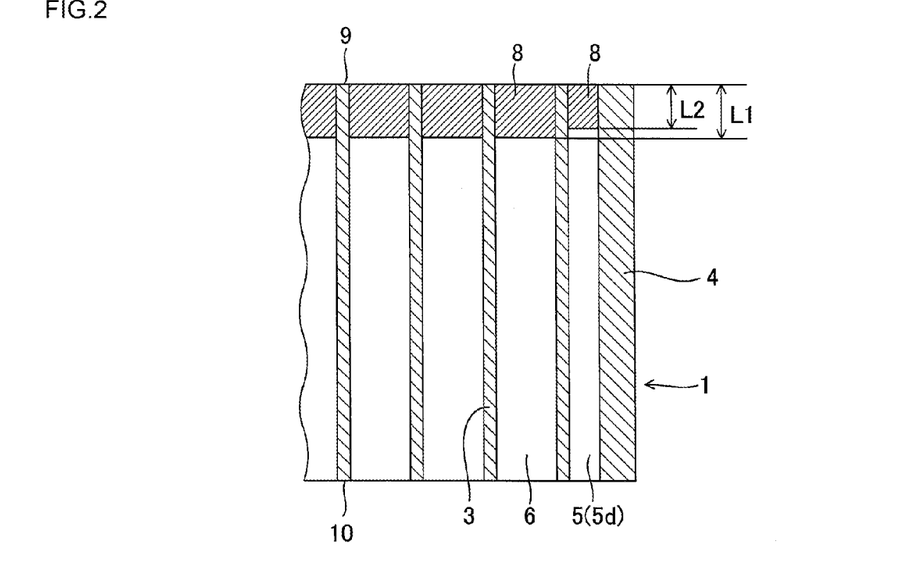
FIG. 2 is a partial sectional view showing a structure of a cross section cut along the A-A line of FIG. 1.
Figure 3:
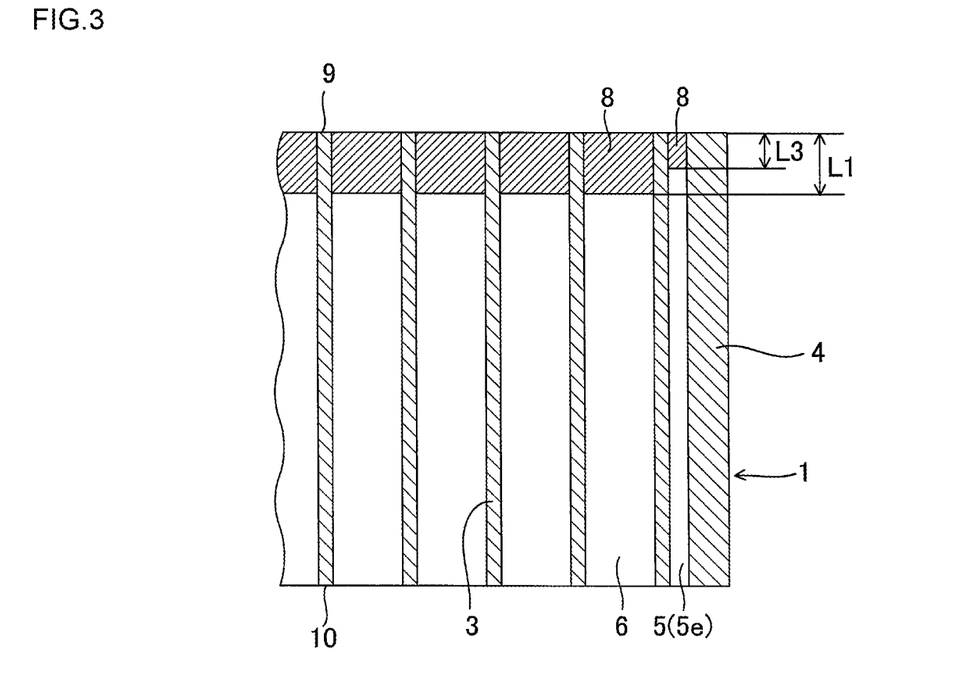
FIG. 3 is a partial sectional view showing a structure of a cross section cut along the B-B line of FIG. 1.

FIG. 1 is a plan view partially showing an end face of a plugged honeycomb structure of the present invention, FIG. 2 is a partial sectional view showing a structure of a cross section cut along the A-A line of FIG. 1, and FIG. 3 is a partial sectional view showing a structure of a cross section cut along the B-B line of FIG. 1.

A plugged honeycomb structure 1 of the present invention has porous partition walls 3 defining and forming a plurality of cells communicating between two end faces 9 and 10, and a circumferential wall 4 formed integrally with the partition walls 3. The cells include partial cells 5 positioned in an outermost circumferential portion of the honeycomb structure and partially in contact with the circumferential wall 4, and normal cells 6 other than the partial cells 5. A part of a contour of each of the partial cells 5 is formed by the circumferential wall 4, and hence the partial cell has a different shape from each of the normal cells 6 and a smaller area than the normal cell 6.

In the plugged honeycomb structure 1 of the present invention, in these cells, as to the normal cells 6, a plugging portion 8 is formed in one end portion of each normal cell in such a plugging pattern that the two end faces 9 and 10 of the honeycomb structure show complementary checkered patterns.

On the other hand, the partial cells 5 are differently treated in accordance with an area ratio obtained by Equation (1) (hereinafter simply referred to as "the area ratio" sometimes). It is to be noted that in Equation (1), "the area of the partial cell" and "the area of the normal cell" mean the areas of these cells in a cross section vertical to an extending direction of the cells.

$$\text{Area ratio}(\%) = \text{the area of the partial cell/the area of the normal cell} \times 100 \qquad (1)$$

Specifically, in the partial cells in which the plugging portion is to be formed in the one end portion thereof to follow the plugging pattern (the plugging pattern of the normal cells 6) (hereinafter referred to simply as "the partial cells in which the plugging portions are to be formed" sometimes), the plugging portion is not formed in at least a part of a partial cell 5a in which the area ratio is smaller than 80%. In this way, the plugging portion is not formed in at least a part of the partial cell having a comparatively small area (area ratio), so that it is possible to alleviate increase of a rigidity (Young's modulus) of the plugged honeycomb structure 1 due to the formation of the plugging portion or a heat insulating operation of the plugging portion. As a result, when a PM accumulated in the plugged honeycomb structure 1 is burnt and removed to recover a filter, generation of a large heat stress or increase of a temperature gradient in the plugged honeycomb structure 1 is inhibited, and a crack resistance during the recovery enhances. It is to be noted that the PM does not easily flow into such partial cells having a comparatively small area (area ratio). Therefore, even when the plugging portion is not formed in a part of the partial cell, a PM trapping performance is not noticeably influenced.

Furthermore, in the present invention, as to the partial cells in which the plugging portions are to be formed, the number of partial cells 5b, which the cells having an area ratio of 80% or more, of 95% or more with respect to the number of all the partial cells each having the 80% or more of the area ratio at which the plugging portion is to be formed, are provided with the plugging portions 8 formed therein. In this way, the plugging portions are formed in most of the partial cells which have a comparatively large area (area ratio) and into which the PM easily flows, so that the PM trapping performance can be kept to be high. It is to be noted that in the aspect of the PM trapping performance, the plugging portions 8 are preferably formed in all the partial cells 5b having the area ratio of 80% or more.

In the present invention, in the partial cells in which the plugging portions are to be formed, a ratio of the number of partial cells 5a in which the area ratio is smaller than 80% and in which the plugging portions are not formed to the number of all the partial cells in which the plugging portions are to be formed is preferably 80% or less. Even in the partial cells which have a comparatively small area (area ratio) and into which the PM does not easily flow, when the number of the partial cells in which the plugging portions are not formed is excessively large, the PM trapping performance is not suitably obtained, but when such conditions are satisfied, the PM trapping performance is not noticeably influenced.

Furthermore, in the present invention, as to the partial cells in which the plugging portions are to be formed, a ratio of the number of partial cells 5c in which the area ratio is smaller than 50% and in which the plugging portions are not formed to the number of all the partial cells in which the plugging portions are to be formed but in which the plugging portions are not formed is preferably 50% or more. Into the small partial cells 5c in which the area ratio is smaller than 50%, the PM does not considerably easily flow. Therefore, when a ratio of the number of the partial cells 5c in which the area ratio is smaller than 50% to the number of all the partial cells in which the plugging portions are not formed is 50% or more, it is possible to minimize an influence, on the PM trapping performance, of the partial cells in which the plugging portions are not formed.

Furthermore, in the present invention, in the partial cells each having the plugging portion 8 formed in one end portion thereof, a length L2 of the plugging portion 8 in a partial cell 5d having an area ratio of 50% or less is preferably 90% or less to a length L1 of the plugging portion 8 in the normal cell 6, and a length L3 of the plugging portion 8 in a partial cell 5e having an area ratio of 20% or less is preferably 60% or less to the length L1 of the plugging portion 8 in the normal cell 6. In this way, the partial cell having a smaller area ratio includes the shorter plugging portion 8, so that it is possible to inhibit the increase of the rigidity (Young's modulus) of the plugged honeycomb structure 1 due to the formation of the plugging portion 8. As a result, it is possible to enhance the crack resistance during the recovery.

In the plugged honeycomb structure of the present invention, from the viewpoints of a strength, a thermal resistance and the like, examples of a material constituting a honeycomb structure main body excluding the plugging portions suitably include silicon carbide (SiC), a silicon-silicon carbide based composite material formed by using silicon carbide (SiC) as aggregates and silicon (Si) as a bonding material, silicon nitride, cordierite, mullite, alumina, spinel, a silicon carbide-cordierite based composite, lithium aluminum silicate, aluminum titanate, and an Fe—Cr—Al based metal. Furthermore, as a material constituting the plugging portions, the same material as in the honeycomb structure main body is preferably used to reduce a difference in thermal expansion from the honeycomb structure main body.

A thickness of the partition walls is preferably from 50 to 2000 µm, more preferably from 100 to 1000 µm, and further preferably from 150 to 700 µm. When the thickness of the partition walls is smaller than 50 µm, the strength is not sufficiently obtained, thereby deteriorating a thermal shock resistance sometimes. On the other hand, when the thickness of the partition walls is in excess of 2000 µm, a pressure loss is excessively large sometimes.

A cell density is preferably from 20 to 600 cpsi (from 3.1 to 93 cells/cm$^2$), more preferably from 50 to 400 cpsi (from 7.8 to 62 cells/cm$^2$), and further preferably from 100 to 300 cpsi (from 15.5 to 46.5 cells/cm$^2$). When the cell density is smaller than 20 cpsi (3.1 cells/cm$^2$), an effective area of the filter is not sufficiently obtained, thereby worsening a PM trapping efficiency sometimes. On the other hand, when the cell density is in excess of 600 cpsi (93 cells/cm$^2$), the pressure loss is excessively large sometimes. It is to be noted that "cpsi" is an abbreviation for "cells per square inch" and is a unit indicating the number of the cells per square inch. For example, 10 cpsi is about 1.55 cells/cm$^2$.

A porosity of the partition walls is preferably from 25 to 75%, more preferably from 30 to 65%, and further preferably from 35 to 65%. When the porosity is smaller than 25%, the pressure loss is excessively large sometimes. On the other hand, when the porosity of the partition walls is in excess of 75%, the strength of the plugged honeycomb structure excessively lowers sometimes. The porosity can be measured by a mercury porosimeter.

An average pore diameter (pore diameters) of the partition walls is preferably from 6 to 35 µm, more preferably from 7 to 30 µm, and further preferably from 7 to 25 µm. When the average pore diameter of the partition walls is smaller than 6 µm, the pressure loss is excessively large sometimes.

On the other hand, when the average pore diameter is in excess of 35 μm, the strength of the plugged honeycomb structure excessively lowers sometimes. The average pore diameter can be measured by the mercury porosimeter.

Figure 4:
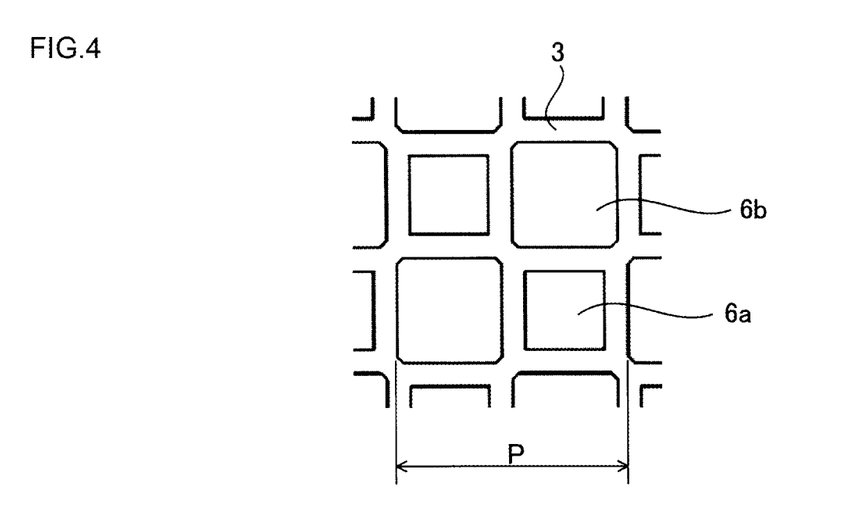
FIG. 4 is a plan view partially showing one example of a cell shape of a honeycomb structure (a honeycomb structure main body) constituting the plugged honeycomb structure of the present invention.

There is not any special restriction on a cell shape of the honeycomb structure main body (a shape of each normal cell in a cross section perpendicular to the cell extending direction), but the shape is preferably a polygonal shape such as a quadrangular shape, a hexagonal shape, or an octagonal shape. Furthermore, as shown in FIG. 4, in two perpendicular directions on the end face of the honeycomb structure, a quadrangular cell 6a and an octagonal cell 6b having different areas may be alternately arranged. It is to be noted that when the area ratio of each partial cell is obtained in such a configuration in which the cells having two types of shapes are present, "the normal cell" in "the area of the normal cell" in Equation (1) is the normal cell having a shape matching a shape (a contour) of the partial cell in which the area ratio is to be obtained and from which a portion in contact with the circumferential wall is excluded, in the normal cells having the two types of shapes.

There is not any special restriction on a shape of the honeycomb structure main body, and examples of the shape include a tubular shape including each end face having a circular shape (a cylindrical shape), a tubular shape including each end face having an oval shape, and a tubular shape including each end face having a polygonal shape (a quadrangular shape, a pentangular shape, a hexagonal shape, a heptagonal shape or an octagonal shape).

As a method of preparing the honeycomb structure main body, a heretofore known method can be used. In one specific example of the method, first, to such a material as described above, there are added a binder such as methylcellulose, hydroxypropoxyl cellulose, hydroxyethyl cellulose, carboxymethylcellulose or polyvinyl alcohol, a pore former, a surfactant, water as a solvent and the like, to obtain a kneaded material having plasticity. Next, this kneaded material is extruded into a predetermined honeycomb form. Next, the obtained honeycomb-like formed body (the honeycomb formed body) is dried by microwaves, hot air or the like, and then fired. The firing may be performed before the plugging portions are formed in the cells, or may be performed together with the firing of the plugging portions after the plugging portions are formed in the cells.

Also as a method of forming the plugging portions in the cells, the heretofore known method can be used. In one specific example of the method, first, a sheet is attached to the end face of the honeycomb structure prepared by such a method as described above. Next, holes are made at positions of this sheet corresponding to the cells in which the plugging portions are to be formed. Next, in a state where this sheet is attached, the end face of the honeycomb structure is immersed into a plugging slurry in which a material constituting the plugging portions is slurried, and the plugging slurry is charged into the end portions of the cells which are to be plugged, through the holes made in the sheet. The plugging slurry charged in this way is dried and then fired to harden, thereby forming the plugging portions.

There is not any special restriction on a use application of the plugged honeycomb structure of the present invention, but the plugged honeycomb structure can especially suitably be used as a filter to trap a PM discharged from a diesel engine or a gasoline engine.

EXAMPLES

Hereinafter, the present invention will be described in more detail on the basis of examples, but the present invention is not limited to these examples.

Examples 1 to 13 and Comparative Examples 1 to 4

To a cordierite constituting material (a mixture of predetermined amounts of talc, alumina and kaolin), a binder, a dispersing agent, water and the like were added and kneaded to obtain a forming kneaded material. This kneaded material was used to obtain a honeycomb-like formed body (the honeycomb formed body) by extrusion, and this body was dried and then fired at a predetermined temperature for a predetermined time, thereby preparing honeycomb structures having such structures as shown in Table 1, respectively. Additionally, in Example 10, in two perpendicular directions on an end face of the honeycomb structure, a quadrangular cell and an octagonal cell were alternately arranged (see FIG. 4).

Next, as to normal cells of each of the honeycomb structures, a plugging portion was formed in one end portion of each normal cell in such a plugging pattern that two end faces of the honeycomb structure showed complementary checkered patterns. Furthermore, in the partial cells, as to the partial cells in which the plugging portion is to be formed in the one end portion thereof to follow the plugging pattern of the normal cells, the plugging portions were formed to obtain such configurations as shown in Table 2. However, in Comparative Example 2, the plugging portions were not formed in any partial cells. Furthermore, in Comparative Example 4, the plugging portions were formed in the normal cells, circumferential processing was performed to remove a circumferential wall, and then a coating material was applied to the processed portion to form the circumferential wall again. When this circumferential wall was formed again, portions which were originally the partial cells were filled with the coating material.

Additionally, in a material constituting the plugging portions, the same material as in a honeycomb structure main body was used. In a forming procedure of the plugging portions, first, a sheet was attached to the end face of the honeycomb structure, and holes were made at positions of this sheet corresponding to the cells in which the plugging portions were to be formed. Next, in the state where this sheet was attached, the end face of the honeycomb structure was immersed in a plugging slurry in which the material constituting the plugging portions was slurried, and the plugging slurry was charged into the end portions of the cells to be plugged, through the holes made in the sheet. The plugging slurry charged in this manner was dried and then fired to harden, thereby forming the plugging portions.

(Evaluation)

As to the plugged honeycomb structures of Examples 1 to 13 and Comparative Examples 1 to 4, a crack resistance during recovery and a PM trapping performance were evaluated by methods described in the following. The results are shown in Table 3.

(Crack Resistance During Recovery (Soot Mass Limit))

The plugged honeycomb structure was used as a diesel particulate filter (DPF), and an amount of soot to be deposited was successively increased to perform recovery (burning of soot), thereby confirming a limit at which cracks were generated. First, a non-thermally expandable mat made of ceramic was wound as a holding material around a circumference of the plugged honeycomb structure, and the plugged honeycomb structure was pushed into a canning can body made of a stainless steel (SUS409), to obtain a canning structure. Afterward, a burning gas including the soot generated by burning a diesel fuel (diesel oil) was allowed to flow into the plugged honeycomb structure from one end face thereof and discharged from the other end face, thereby depositing the soot in the honeycomb structure. Then, the honeycomb structure was cooled down to room temperature (25° C.) once, and then the burning gas of 680° C. was allowed to flow into the plugged honeycomb structure from the one end face. Furthermore, when a pressure loss of the plugged honeycomb structure was lowered by burning the soot, a flow rate of the burning gas was decreased to rapidly burn the soot. Afterward, presence/absence of the generation of the cracks in the plugged honeycomb structure was confirmed. This test was started from a state where the amount of the soot to be deposited was 4 g/L (the amount of the soot to be deposited per liter of a volume of the plugged honeycomb structure), and the amount of the soot to be deposited was increased every 0.5 g/L until it was recognized that the cracks were generated. This was repeatedly performed. The amount of the soot deposited at the generation of the cracks was obtained as a value of a soot mass limit (SML). When this value was 7.0 g/L or more, the evaluation was "A"; when the value was 6.5 g/L or more and smaller than 7.0 g/L, the evaluation was "B"; when the value was 6.0 g/L or more and smaller than 6.5 g/L, the evaluation was "C"; when the value was 5.5 g/L or more and smaller than 6.0 g/L, the evaluation was "D"; when the value was 5.0 g/L or more and smaller than 5.5 g/L, the evaluation was "E"; and when the value was smaller than 5.0 g/L, the evaluation was "F". When this evaluation is from A to C, it can be considered that the plugged honeycomb structure has an excellent crack resistance during the recovery.

(PM Trapping Performance)

The plugged honeycomb structure was used as the diesel particulate filter (DPF), and a PM trapping performance was evaluated in conformity with a PN measuring method (the particulate number measuring method) proposed by a particle measuring program (PMP) by the Working Party on Pollution and Energy in the United Nations Economic Commission for Europe. First, the non-thermally expandable mat made of ceramic was wound as the holding material around the circumference of the plugged honeycomb structure, and the plugged honeycomb structure was pushed into the canning can body made of the stainless steel (SUS409), to obtain the canning structure. Afterward, this canning structure was mounted as the DPF on a diesel engine car having a displacement of 2.0 L, and the car was driven in EUDC (Extra Urban Driving Cycle) three times. Then, after soak (engine stop) for eight hours or more, the number of particles of the PM which were not trapped by the DPF was measured in an NEDC (New European Driving Cycle) mode. When this number of the particles was smaller than $1\times10^{11}$ particles/km, the evaluation was "A"; when the number of the particles was $1\times10^{11}$ particles/km or more and smaller than $3\times10^{11}$ particles/km, the evaluation was "B"; when the number of the particles was $3\times10^{11}$ particles/km or more and smaller than $5\times10^{11}$ particles/km, the evaluation was "C"; when the number of the particles was $5\times10^{11}$ particles/km or more and smaller than $7\times10^{11}$ particles/km, the evaluation was "D"; when the number of the particles was $7\times10^{11}$ particles/km or more and smaller than $9\times10^{11}$ particles/km, the evaluation was "E"; and when the number of the particles was $9\times10^{11}$ particles/km or more, the evaluation was "F". When this evaluation is from A to C, it can be considered that the plugged honeycomb structure has an excellent PM trapping performance.

TABLE 1

| | End face shape of honeycomb structure | Dimension of honeycomb structure [mm] | Thickness of partition walls [mm] | Cell density [cells/cm$^2$] | Cell shape | Cell area [mm$^2$] | Cell pitch [mm] |
|---|---|---|---|---|---|---|---|
| Example 1 | Circular | Dia. 143.8, Length 152.4 | 0.305 | 46.5 | Quadrangular | 1.36 | 1.47 |
| Example 2 | Circular | Dia. 143.8, Length 152.4 | 0.305 | 46.5 | Quadrangular | 1.36 | 1.47 |
| Example 3 | Circular | Dia. 143.8, Length 152.4 | 0.305 | 46.5 | Quadrangular | 1.36 | 1.47 |
| Example 4 | Circular | Dia. 143.8, Length 152.4 | 0.305 | 46.5 | Quadrangular | 1.36 | 1.47 |
| Example 5 | Circular | Dia. 143.8, Length 152.4 | 0.305 | 46.5 | Quadrangular | 1.36 | 1.47 |
| Example 6 | Circular | Dia. 143.8, Length 152.4 | 0.305 | 46.5 | Quadrangular | 1.36 | 1.47 |
| Example 7 | Circular | Dia. 143.8, Length 152.4 | 0.305 | 46.5 | Quadrangular | 1.36 | 1.47 |
| Example 8 | Circular | Dia. 143.8, Length 152.4 | 0.305 | 46.5 | Quadrangular | 1.36 | 1.47 |
| Example 9 | Circular | Dia. 143.8, Length 152.4 | 0.305 | 46.5 | Quadrangular | 1.36 | 1.47 |
| Example 10 | Circular | Dia. 143.8, Length 152.4 | 0.305 | 46.5 | Octagonal Quadrangular | 1.64 1.08 | 1.47 *1 |
| Example 11 | Circular | Dia. 143.8, Length 152.4 | 0.432 | 15.5 | Quadrangular | 4.44 | 2.54 |
| Example 12 | Circular | Dia. 190.5, Length 203.2 | 0.305 | 31.0 | Quadrangular | 2.24 | 1.80 |
| Example 13 | Oval | Long Dia. 177.8, Short Dia. 114.3, Length 127.0 | 0.305 | 46.5 | Quadrangular | 1.36 | 1.47 |
| Comparative Example 1 | Circular | Dia. 143.8, Length 152.4 | 0.305 | 46.5 | Quadrangular | 1.36 | 1.47 |
| Comparative Example 2 | Circular | Dia. 143.8, Length 152.4 | 0.305 | 46.5 | Quadrangular | 1.36 | 1.47 |
| Comparative Example 3 | Circular | Dia. 143.8, Length 152.4 | 0.305 | 46.5 | Quadrangular | 1.36 | 1.47 |
| Comparative Example 4 | Circular | Dia. 143.8, Length 152.4 | 0.305 | 46.5 | Quadrangular | 1.36 | 1.47 |

*1 Value obtained when a cell pitch (P in FIG. 4) for two cells of an octagonal cell combined with a quadrangular cell was ½

TABLE 2

|  | Ratio of No. of partial cells in which area ratio is smaller than 80% and plugging portions are not formed *1 [%] | Ratio of No. of partial cells in which area ratio is 80% or more and plugging portions are formed *2 [%] | Ratio of No. of partial cells in which area ratio is smaller than 50% and plugging portions are not formed *3 [%] | Ratio of length of plugging portion in partial cell having area ratio of 50% or less *4 [%] | Ratio of length of plugging portion in partial cell having area ratio of 20% or less *5 [%] |
|---|---|---|---|---|---|
| Example 1 | 4 | 100 | 98 | 72 | 52 |
| Example 2 | 6 | 100 | 92 | 76 | 44 |
| Example 3 | 16 | 100 | 94 | 68 | 43 |
| Example 4 | 35 | 100 | 80 | 55 | 39 |
| Example 5 | 76 | 100 | 58 | 48 | 38 |
| Example 6 | 15 | 100 | 78 | 98 | 86 |
| Example 7 | 18 | 98 | 85 | 84 | 74 |
| Example 8 | 83 | 100 | 43 | 38 | 29 |
| Example 9 | 78 | 100 | 37 | 48 | 44 |
| Example 10 | 18 | 100 | 89 | 65 | 47 |
| Example 11 | 27 | 100 | 64 | 88 | 58 |
| Example 12 | 28 | 100 | 58 | 59 | 42 |
| Example 13 | 78 | 96 | 54 | 49 | 38 |
| Comparative Example 1 | 92 | 58 | 100 | 38 | 35 |
| Comparative Example 2 | 100 | 0 | 51 | — | — |
| Comparative Example 3 | 76 | 92 | 64 | 98 | 71 |
| Comparative Example 4 | — | — | — | — | — |

*1: Ratio to the number of all the partial cells in which the plugging portions are to be formed
*2: Ratio to the number of all the partial cells in which the plugging portions are to be formed and the area ratio is 80% or more
*3: Ratio to the number of all the partial cells in which the plugging portions are to be formed but the plugging portions are not formed
*4, *5: Ratio to the length of the plugging portion in the normal cell

TABLE 3

|  | Crack resistance during recovery | PM trapping performance |
|---|---|---|
| Example 1 | B | A |
| Example 2 | B | A |
| Example 3 | B | B |
| Example 4 | B | B |
| Example 5 | A | C |
| Example 6 | C | B |
| Example 7 | C | B |
| Example 8 | A | C |
| Example 9 | B | C |
| Example 10 | B | A |
| Example 11 | B | B |
| Example 12 | C | B |
| Example 13 | B | C |
| Comparative Example 1 | B | E |
| Comparative Example 2 | A | F |
| Comparative Example 3 | C | D |
| Comparative Example 4 | E | A |

As shown in Table 3, as to the plugged honeycomb structures of Examples 1 to 13, suitable results were obtained in the evaluation of each of the crack resistance during the recovery and the PM trapping performance. On the other hand, in each of Comparative Examples 1 to 3 where in the partial cells in which the plugging portions were to be formed, the number of the partial cells in which the area ratio was 80% or more and in which the plugging portions were formed to the number of all the partial cells having the 80% or more of the area ratio in which the plugging portions were to be formed was smaller than 95%, the PM trapping performance was not sufficiently obtained. Especially, in Comparative Example 2 where the plugging portion was not formed in any partial cell, the PM trapping performance was very low. Furthermore, in Comparative Example 4 where the portions which were originally the partial cells were filled with the coating material when the circumferential wall was formed again, the PM trapping performance was suitably obtained, but the crack resistance during the recovery was low.

INDUSTRIAL APPLICABILITY

A plugged honeycomb structure of the present invention can suitably be used as, for example, a filter to trap a particulate matter such as soot discharged from a diesel engine or a gasoline engine.

DESCRIPTION OF REFERENCE NUMERALS

1: plugged honeycomb structure, 3: partition wall, 4: circumferential wall, 5 (5a to 5e): partial cell, 6: normal cell, 6a: quadrangular cell, 6b: octagonal cell, 8: plugging portion, and 9 and 10: end face.

The invention claimed is:
1. A plugged honeycomb structure comprising a honeycomb structure having porous partition walls defining and forming a plurality of cells communicating between two end faces, and a circumferential wall formed integrally with the partition walls,
wherein the cells comprise partial cells positioned in an outermost circumferential portion of the honeycomb structure and being partially in contact with the circumferential wall, and normal cells other than the partial cells, the partial cells comprising both partial cells each having an area ratio obtained by Equation (1) of smaller than 80% and partial cells each having an area ratio obtained by Equation (1) of 80% or more,
as to the normal cells, a plugging portion is formed in one end portion of each normal cell in such a plugging pattern that the two end faces of the honeycomb structure show complementary checkered patterns, and as to the partial cells, in the partial cells in which the plugging portion is to be formed in one end portion thereof to follow the plugging pattern, the plugging portion is not formed in at least some of the partial cells each having an area ratio obtained by Equation (1) of smaller than 80%, and in the partial cells each having an area ratio of 80% or more obtained by Equation (1) and at which the plugging portion is to be formed in the one end portion to follow the plugging pattern, 95% or more, with respect to the total number of such partial cells each having an area ratio of 80% or more at which the plugging portion is to be formed in the one end portion to follow the plugging pattern, are provided with the plugging portions formed therein:

$$\text{the area ratio (\%)} = \text{an area of the partial cell}/\text{an area of the normal cell} \times 100 \quad (1).$$

2. The plugged honeycomb structure according to claim 1, wherein in the partial cells in which the plugging portion is to be formed in the one end portion thereof to follow the plugging pattern, the plugging portions are formed in all the partial cells in which the area ratio obtained by Equation (1) is 80% or more.

3. The plugged honeycomb structure according to claim 2, wherein, in the partial cells in which the plugging portion is to be formed in the one end portion thereof to follow the plugging pattern, the ratio of the number of such partial cells in which the area ratio obtained by Equation (1) is smaller than 80% and in which the plugging portions are not formed, relative to the number of all the partial cells in which the plugging portion is to be formed in the one end portion thereof to follow the plugging pattern, is 80% or less.

4. The plugged honeycomb structure according to claim 3, wherein, in the partial cells in which the plugging portion is to be formed in the one end portion thereof to follow the plugging pattern, a ratio of the number of such partial cells in which the area ratio obtained by Equation (1) is smaller than 50% and in which the plugging portions are not formed, relative to the number of all the partial cells in which the plugging portion is to be formed in the one end portion thereof to follow the plugging pattern but in which the plugging portion is not formed, is 50% or more.

5. The plugged honeycomb structure according to claim 4, wherein, in the partial cells each having the plugging portion formed in the one end portion thereof, a length of the plugging portion in the partial cell in which the area ratio obtained by Equation (1) is 50% or less is 90% or less relative to a length of the plugging portion in the normal cell, and a length of the plugging portion in the partial cell in which the area ratio obtained by Equation (1) is 20% or less is 60% or less of the length of the plugging portion in the normal cell.

6. The plugged honeycomb structure according to claim 3, wherein, in the partial cells each having the plugging portion formed in the one end portion thereof, a length of the plugging portion in the partial cell in which the area ratio obtained by Equation (1) is 50% or less is 90% or less relative to a length of the plugging portion in the normal cell, and a length of the plugging portion in the partial cell in which the area ratio obtained by Equation (1) is 20% or less is 60% or less of the length of the plugging portion in the normal cell.

7. The plugged honeycomb structure according to claim 2, wherein, in the partial cells each having the plugging portion formed in the one end portion thereof, a length of the plugging portion in the partial cell in which the area ratio obtained by Equation (1) is 50% or less is 90% or less relative to a length of the plugging portion in the normal cell, and a length of the plugging portion in the partial cell in which the area ratio obtained by Equation (1) is 20% or less is 60% or less of the length of the plugging portion in the normal cell.

8. The plugged honeycomb structure according to claim 1, wherein, in the partial cells in which the plugging portion is to be formed in the one end portion thereof to follow the plugging pattern, the ratio of the number of such partial cells in which the area ratio obtained by Equation (1) is smaller than 80% and in which the plugging portions are not formed, relative to the number of all the partial cells in which the plugging portion is to be formed in the one end portion thereof to follow the plugging pattern, is 80% or less.

9. The plugged honeycomb structure according to claim 8, wherein, in the partial cells in which the plugging portion is to be formed in the one end portion thereof to follow the plugging pattern, a ratio of the number of such partial cells in which the area ratio obtained by Equation (1) is smaller than 50% and in which the plugging portions are not formed, relative to the number of all the partial cells in which the plugging portion is to be formed in the one end portion thereof to follow the plugging pattern but in which the plugging portion is not formed, is 50% or more.

10. The plugged honeycomb structure according to claim 9, wherein, in the partial cells each having the plugging portion formed in the one end portion thereof, a length of the plugging portion in the partial cell in which the area ratio obtained by Equation (1) is 50% or less is 90% or less relative to a length of the plugging portion in the normal cell, and a length of the plugging portion in the partial cell in which the area ratio obtained by Equation (1) is 20% or less is 60% or less of the length of the plugging portion in the normal cell.

11. The plugged honeycomb structure according to claim 8, wherein, in the partial cells each having the plugging portion formed in the one end portion thereof, a length of the plugging portion in the partial cell in which the area ratio obtained by Equation (1) is 50% or less is 90% or less relative to a length of the plugging portion in the normal cell, and a length of the plugging portion in the partial cell in which the area ratio obtained by Equation (1) is 20% or less is 60% or less of the length of the plugging portion in the normal cell.

12. The plugged honeycomb structure according to claim 1, wherein, in the partial cells each having the plugging portion formed in the one end portion thereof, a length of the plugging portion in the partial cell in which the area ratio obtained by Equation (1) is 50% or less is 90% or less relative to a length of the plugging portion in the normal cell, and a length of the plugging portion in the partial cell in which the area ratio obtained by Equation (1) is 20% or less is 60% or less of the length of the plugging portion in the normal cell.

* * * * *